(12) United States Patent
Scattergood et al.

(10) Patent No.: US 8,690,974 B2
(45) Date of Patent: Apr. 8, 2014

(54) HYDROGEN GENERATORS

(75) Inventors: Darren Paul Scattergood, Hampshire (GB); Graham Manton, Kent (GB); Gareth Thomas Flegg, Surrey (GB); Robert John Vere Churton, Hampshire (GB); Philip Nicholas Barnes, Hampshire (GB); William Ranulf Slee, Hampshire (GB)

(73) Assignee: Qinetiq Limited (GB)

( * ) Notice: Subject to any disclaimer, the term of this patent is extended or adjusted under 35 U.S.C. 154(b) by 747 days.

(21) Appl. No.: 12/681,996

(22) PCT Filed: Oct. 14, 2008

(86) PCT No.: PCT/GB2008/003475
§ 371 (c)(1),
(2), (4) Date: Jun. 11, 2010

(87) PCT Pub. No.: WO2009/050443
PCT Pub. Date: Apr. 23, 2009

(65) Prior Publication Data
US 2010/0247425 A1    Sep. 30, 2010

(30) Foreign Application Priority Data

Oct. 16, 2007  (GB) .................. 0720171.8
Oct. 16, 2007  (GB) .................. 0720173.4
Oct. 16, 2007  (GB) .................. 0720174.2
Oct. 9, 2008  (GB) .................. 0818451.7

(51) Int. Cl.
*C10J 3/00*   (2006.01)
*B01J 3/00*   (2006.01)

(52) U.S. Cl.
USPC ................ 48/61; 48/197 R; 48/210; 423/644; 423/650

(58) Field of Classification Search
USPC ............................................. 48/61; 422/625
See application file for complete search history.

(56) References Cited

U.S. PATENT DOCUMENTS 2,886,507 A * 5/1959 Elliott et al. .................... 208/78
3,419,361 A 12/1968 Bratton et al.
(Continued)

FOREIGN PATENT DOCUMENTS

DE    1909732    2/1970
FR    2906805    4/2008
(Continued)

OTHER PUBLICATIONS

U.S. Appl. No. 12/717,584, filed Mar. 4, 2010 entitled: Hydrogen Generator and Fuel Stick.
(Continued)

*Primary Examiner* — Matthew Merkling
(74) *Attorney, Agent, or Firm* — McDonnell Boehnen Hulbert & Berghoff LLP

(57) ABSTRACT

A pyrolytic hydrogen generator comprising a pressure vessel containing a plurality of cardboard receptacles for the thermally decomposable hydrogen generating material and an associated ignition system. Also, a modular pellet tray assembly for use in the generator comprises a plurality of trays having pellet holders and associated igniters and held in a stack by support rods that also provide electrical connectivity to the trays. Also, a pellet tray assembly comprises a plurality of pellet holders, wherein some of more outwardly disposed pellet holders contain only outwardly facing vents and are fired first. Also, the generator has an array of hydrogen generating elements arranged side by side and separated from one another into cells by partitioning provided with directional venting that only permits laterally exiting gases to vent outwardly. Alternatively, the elements can be separated into cells by a baffle system comprising gas confining and gas venting elements, which may be heat conductive.

14 Claims, 15 Drawing Sheets

(56) References Cited

U.S. PATENT DOCUMENTS

| | | | |
|---|---|---|---|
| 4,055,632 A | 10/1977 | Hoffman et al. | |
| 4,157,927 A | 6/1979 | Chew et al. | |
| 4,270,360 A | 6/1981 | Nakane et al. | |
| 4,315,786 A | 2/1982 | English et al. | |
| 4,468,263 A | 8/1984 | Artz et al. | |
| 5,006,920 A | 4/1991 | Schafer | |
| 5,037,518 A | 8/1991 | Young et al. | |
| 5,702,491 A | 12/1997 | Long et al. | |
| 5,817,157 A | 10/1998 | Checketts | |
| 6,274,093 B1 | 8/2001 | Long et al. | |
| 7,052,658 B2 | 5/2006 | Arthur et al. | |
| 7,094,487 B2 | 8/2006 | Desgardin et al. | |
| 7,261,748 B2 | 8/2007 | Jones et al. | |
| 7,505,161 B2 | 3/2009 | Kathan et al. | |
| 7,682,411 B2 | 3/2010 | Jones et al. | |
| 7,943,014 B2 * | 5/2011 | Berruti et al. | 202/108 |
| 2002/0006365 A1 | 1/2002 | Suzuki et al. | |
| 2004/0065395 A1 | 4/2004 | Desgardin et al. | |
| 2004/0131904 A1 | 7/2004 | Arthur et al. | |
| 2005/0142404 A1 | 6/2005 | Boucher et al. | |
| 2005/0180916 A1 | 8/2005 | Autrey et al. | |
| 2005/0227136 A1 | 10/2005 | Kikuchi et al. | |

FOREIGN PATENT DOCUMENTS

| | | |
|---|---|---|
| GB | 2165532 | 4/1986 |
| JP | 2002-161997 | 6/2002 |
| JP | 2004-68896 | 3/2004 |
| JP | 2005-321490 | 11/2005 |
| WO | WO 02/18267 | 3/2002 |
| WO | WO 03/084866 | 10/2003 |
| WO | WO 2004/092675 | 10/2004 |
| WO | WO 2007/032742 | 3/2007 |
| WO | WO 2007/088923 | 8/2007 |
| WO | WO 2007/098271 | 8/2007 |
| WO | WO 2008/066486 | 6/2008 |

OTHER PUBLICATIONS

U.S. Appl. No. 12/865,467, filed Jul. 30, 2010 entitled: Hydrogen Generator and Fuel Pellet.

* cited by examiner

HYDROGEN GENERATORS

BACKGROUND OF THE INVENTION (1) Field of the Invention

This invention relates to improvements in hydrogen generators. More specifically, it relates to a pyrolytic hydrogen generator in which a material can be thermally decomposed to generate hydrogen. The invention is particularly suitable for lightweight applications including man portable applications, especially as part of a fuel cell system. The generator can, however, be used in other systems that require hydrogen on demand, such as larger fuel cells, hydrogen engines or gas chromatographs.

(2) Description of the Art

Hydrogen generating systems fall into two broad classes: the generation of hydrogen from liquid or gaseous hydrocarbons, usually referred to as reformation; and hydrogen generation by the decomposition of hydrogen containing compounds. The decomposition of hydrogen containing compounds can be further categorised; firstly, decomposition in the presence of water, referred to as hydrolysis, and secondly, decomposition by heat, referred to as pyrolysis or thermolysis.

The thermal decomposition of chemical hydrides such as amine boranes and metal borohydrides is commonly used as a means for generating hydrogen. Early patents described the decomposition of these compounds to produce hydrogen in a 'one shot' non-controllable reactor for use with high energy chemical lasers. Applicant's International Patent Application Publication No. WO 02/18267 describes a pyrolytic hydrogen generator in which ignition at the hydrogen generating elements is controlled by an ignition control system to allow, for example, for successive or simultaneous ignition of individual pellets in a controllable and load responsive manner.

US2005/0142404 details a variety of pyrolytic gas generation systems in which heat generating elements are supported in various arrays.

SUMMARY OF THE INVENTION

The present invention provides in a first aspect a pyrolytic hydrogen generator comprising a pressure vessel comprising a tray assembly comprising a plurality of receptacles for receiving thermally decomposable hydrogen generating material, wherein the tray assembly comprises cardboard components.

The cardboard components will usually comprise one or more layers of cardboard forming components that act as a barrier and/or as insulation and/or as a support and/or as a retainer and/or as a separator or similar purpose. In a preferred arrangement, the receptacles (or hydrogen generating units) comprise cardboard receptacles (or housings).

Hydrogen generators based on pyrolysis are immediately distinguishable from ones based on hydrolysis, due to the very different operating conditions and components. (For example, those based on hydrolysis necessarily contain devices such as water tight seals for controlling water ingress.) In a pyrolytic hydrogen generator, it has been found possible to replace the traditional prior art ceramic pellet holders with a cardboard housing without significant contamination of the hydrogen output, since it has been found that they do not substantially decompose or degrade in the hydrogen atmosphere despite the elevated temperatures. Their inertness in such an environment therefore permits their use to optimise energy densities in portable power systems where it is critical that the hydrogen generator is as lightweight as possible. Contrary to established understanding, other support or retaining structures or insulating or separating structures may similarly be replaced with cardboard structures. Such structures may include, for example, cardboard retaining rings or discs to hold hydrogen generating pellets in place, cardboard barriers or separators to prevent gas or other chemical contamination, cardboard supports for supporting or positioning or separating electrical components or pellet holders (either cardboard or ceramic), or cardboard insulators for insulating electrical components or for heat insulation.

The term "cardboard" is to be interpreted broadly to include any stiff, moderately thick paper product, including paper products made from unbleached craft paper and products known as "rocket paper". The generator may be in a loaded (i.e. containing hydrogen generating material) or unloaded condition.

In an alternative first aspect, there is provided a pyrolytic hydrogen generator comprising a pressure vessel comprising a pellet tray assembly comprising a plurality of hydrogen generating elements for receiving thermally decomposable hydrogen generating material, wherein the pellet tray assembly comprises cardboard components.

In a further alternative first aspect, there is provided a pyrolytic hydrogen generator comprising a pressure vessel comprising a plurality of receptacles for receiving thermally decomposable hydrogen generating material and an ignition system associated with the receptacles for initiating decomposition, wherein the receptacles comprise cardboard receptacles.

References hereinafter to an "ignition system" and "ignitors" forming that system refer to an initiating system for initiating thermal decomposition of the hydrogen generating material and the devices/initiators themselves that initiate this. Hence, an ignitor might comprise a heater coil or any other device that can supply heat strongly.

The cardboard receptacles may comprise separate respective receptacles or housings and may be arranged randomly or in an ordered array, preferably in close packed arrangements. Separate housings help avoid problems of cross-ignition, especially in systems where high heat output from the decomposing material is a problem. However, grid or mesh arrangements or similar linked networks of cardboard cells (i.e. integral arrangements where housings share common walls) may be used instead of, or indeed, in addition to, separate housings.

Prior to operation, the receptacles may each be loaded with an amount of a thermally decomposable hydrogen generating material. This may be in the form of one or more pellets, which may be of any shape or size. An optional amount of a heat generating material may also be loaded into each housing, which material is capable of being initiated by the ignition system and is capable of subsequently decomposing the hydrogen generating material. The pellet configuration may comprise a first layer of a heat generating mixture capable of being ignited by, and arranged adjacent to, an ignitor (initiator) of the ignition (initiation) system and a second layer comprising a hydrogen generating mixture. Alternatively, the first layer may comprise a heat and hydrogen generating mixture, while the second layer or portion is the main hydrogen containing compound. Suitable heat generating and/or hydrogen generating mixtures are described in WO02/18267, the entire disclosure of which is incorporated herein by reference; however, ammonia borane provides a particularly energy dense hydrogen source.

The cardboard receptacle may be fixedly or removably attached to a support tray or printed circuit board inside the pressure vessel. A plurality of separate or linked housings may be provided on one or more support trays. Each housing may comprise a tube or concave holder of any suitable shape for holding the gas generating material. It may have one open end, two opposite open ends or two opposite closed ends although a cup or box shape with a closed end adjacent the ignition means and an open distil end will normally be used. However, the distil end may have a lid and may have a fastener to secure the lid in place, where expansion of decomposition products is likely.

The cardboard housing may comprise a cardboard tube. This may have optional first and/or second cardboard end walls. The tube may be of any suitable cross-section, but will usually be of circular or square cross-section. It may be open or closed. The one or both end cardboard end walls, if present, may be formed integrally, but are preferably formed separately, and may be fixedly or movably attached to one or both ends of the tube, either across the ends, or if of slightly reduced diameter, disposed as discs or annular washers inside the tube at or near either end. A cardboard retainer ring may be inserted telescopically inside the tube, preferably comprising a much shorter tube of slightly smaller diameter, to hold, for example, a pellet in place below it. This will provide the intimate contact necessary for efficient heat transfer, prevent pellet movement during decomposition while permitting expansion of decomposition products.

Each cardboard housing may have a respective ignitor associated with it, and arranged to ignite its contents, once loaded therein, on an individual basis, either successively or simultaneously to other ignitors. Usually, the hydrogen generator comprises an ignition control system arranged to control the rate of ignition at each respective housing, for example, to make the system load responsive. Each ignitor is normally located in the cardboard housing's interior.

The cardboard housings may be mounted directly onto circuit boards, thereby dispensing with additional support trays and saving space and weight. Preferably, the pellet holders are mounted on circuit boards by means of pairs of flanges extending downwardly from the ignitors.

Cardboard allows tiny amounts of hydrogen to diffuse slowly through the walls of the housing which may assist in reduced expansion of decomposition products, for example, in the case of ammonia borane decomposition. However, for heat management reasons, the cardboard housing may have vents to direct bulk flow of evolved hydrogen quickly out of the housing towards the walls of the pressure vessel. For example, such vents may comprise perforations, slits, slots or any other suitable holes, notches or gaps specifically intended for venting purposes. Those requirements may differ depending on whether the hydrogen generator is intended for high power applications, where the generator is quite large and cooling of the hydrogen generating elements is needed to prevent cross-ignition or, low power applications, where the generator is compact and heat needs to be retained in the vicinity of the hydrogen generating elements. Matching or aligned vents, e.g. holes, perforations, slits, notches, etc, may correspondingly be provided in any adjacent structures such as a tube and/or washers and/or retainer rings also forming part of the housing.

Preferably, the vents are arranged in the final assembled apparatus so as to direct the output gas flow outwardly away from the centre of the apparatus, for example, the centre of each tray. In that case, the generator may have a controlled ignition system with a programmed firing sequence that, in use, causes the outermost (rings of) pellets to fire prior to any inwardly disposed (rings of) pellets. Where successive outer regions (e.g. rings) of pellet holders are present, then in use each region may be substantially all fired, in successive order, starting with the outermost region and ending with the innermost region.

Thermal insulation may be provided within the pressure vessel to reduce heat transfer from the hydrogen generating elements and hence, cross-ignition. However, the insulating properties of the cardboard housings may obviate the need for any other thermal insulation in the pressure vessel. Thus, in the case of the loaded and operational hydrogen generator (where the loaded energy density and firing sequence is defined), the cardboard housings may be so selected and arranged as to prevent cross-ignition during operation, without any other insulation being present in the pressure vessel.

The hydrogen generator may be man portable.

There is further provided portable equipment comprising a hydrogen generator as described above; such equipment may be in the form of a fuel cell system.

In an alternative first aspect, the present invention provides a pyrolytic hydrogen generator comprising a pressure vessel containing an array of pellet holders for supporting pellets of any shape, whether regular or irregular shape, solid or hollow (e.g. rods, tubes, rings, doughnut shaped masses, powder, granules, segments, etc) of thermally decomposable hydrogen generating material and an ignition system linked to the holders, wherein each holder is formed from cardboard. The housing is lightweight and inexpensive to produce, allows hydrogen diffusion through its walls, insulates so as to prevent cross-ignition, can be perforated to direct the flow of evolved hydrogen, and does not produce contaminants. The housing may be directly attached to a circuit board and may be readily adapted to receive different ignitor devices.

In the second aspect of the present invention, there is provided a modular pellet tray assembly for use in a pyrolytic hydrogen generator comprising a plurality of pellet holder trays mounted on top of each other by means of a plurality of support rods to form a stack, wherein each tray comprises a plurality of pellet holders and associated ignitors for igniting any pellets loaded, in use, into the respective pellet holders, and wherein the support rods also provide the electrical connectivity within the stack.

Such an arrangement is lightweight, quick to assemble, and most importantly is compact, permitting higher energy densities to be achieved. In particular, it avoids the need for external wires to be attached directly to each tray, or attached along the stack.

References to the trays being mounted "on top of each other" should be liberally construed and do not necessarily require the stack to be upright, since it is intended that the trays could lie in any orientation providing that they are adjacent to one another so as to form a stack.

Advantageously, the electrical connectivity is directed to operate the ignitors.

The support rods may form individual columns of support rods extending throughout the length of the stack. Such an arrangement provides strength and rigidity in the structure. The support rods may be single (one piece) rods that extend the length of the stack, i.e. one rod/column, in which case trays of pellet holders may be dropped onto the rods to build the assembly. This arrangement is strong, has good electrical connectivity and is quick to assemble. However, if any particular tray needs attention, it is necessary to dismantle the stack down to the level of the tray in question. Alternatively, support rods may extend the height of one tray only or extend the height of two or three trays (i.e. multiple trays), in which case interconnections between the rods need to be provided, but there is then the advantage that the stack can be of variable length. The rods can either connect directly to one another, or conducting connectors can be used to provide the electrical connectivity, the later preferably being provided within the tray itself. The support rods can still be aligned to form individual columns of support rods extending throughout the length of the stack (as in the case of the one piece rods).

The assembly needs to be as compact as possible, to maximise energy densities, so will usually be formed from complete trays that include a set of pellet holders and a set of support rods roughly the same length as the pellet holders, so there is no dead space; the stack is then assembled by stacking each complete tray on top of the one below. In this highly preferred arrangement, the stack can be assembled merely by stacking each complete tray on top of the one below, without the need for ancillary support rods or connectors.

The support rods are usually received within conducting bores or channels located in each tray. The channels or bores may be integrally formed, for example, as part of a circuit board (that forms the tray or a top layer thereof), or may comprise discrete connectors mounted individually in the trays, either of which are then connected to the ignitors. A plurality of annular pin grips extending through each pellet tray may be adapted to receive and grip the support rods.

Pellet holders of the respective trays may be aligned throughout the stack stacked one above another to form columns of pellet holders. This allows the trays' wiring to be simplified.

Many wiring arrangements are possible. However, a support rod column (either made of one rod or of set of rods) may be dedicated to providing power to a particular tray, with x columns powering x respective trays. Similarly, a support rod column may be dedicated to connecting one column of aligned pellet holders to earth, there being y columns connecting y respective columns of pellet holders. If both types are provided, any pellet holder on any tray may be isolated and its firing individually controlled, by a switch, independently of other pellet holders in the same tray or the same column.

Preferably, the pellet holders are circular, in which case each tray is also preferably circular. In a preferred embodiment each tray has six pellet holders arranged symmetrically around a central seventh pellet holder. Pellet holders located around the periphery of the trays may have outwardly facing venting perforations. However, further outer rings may be provided (e.g. 19 pellet holders/tray), in which case all the pellet holders in the outer rings may have outwardly facing venting perforations i.e. holes or slits only provided on faces that are directed away from any inwardly disposed pellet holders. In that case, an ignition control system may arrange for outwardly disposed pellet holders to have their ignitors initiated before those of inwardly disposed pellet holders.

Advantageously, the pellet holders each comprise cardboard housings, although they may also be ceramic. The cardboard housings may be of the form described above. To eliminate dead space, the pellet holders' upper and lower ends will usually abut pellet trays above and below them. Other cardboard structures as described above may also be provided in the pellet tray assembly.

In a third aspect of the invention, there is provided a pellet tray assembly for use in a pyrolytic hydrogen generator and comprising at least one pellet holder tray comprising a plurality of pellet holders, wherein at least some of the more outwardly disposed pellet holders contain only outwardly facing vents. In use, such an arrangement allows the outer pellet holders to be fired first without risk of cross-ignition of the inner holders' contents.

The phrase "pellet holders" should be construed broadly to cover jackets or wraps surrounding the pellet holders, since the controlled outward venting needs to be achieved by providing the selective venting in whatever outer boundary finally controls the exit of gases from the individual pellet holders. The vents direct bulk flow of evolved hydrogen quickly out of the housing towards the walls of the pressure vessel and may comprise perforations, slits, slots or any other suitable holes, notches or gaps specifically intended for venting purposes. For example, the pellet holder may have only outwardly positioned notches in its top edge which, in combination with an adjacent lid on top of the holder, provide for selective outward venting.

Preferably no holes or gaps should be present in non-centrally located pellet holders that would be large enough to permit fast escape of hydrogen towards inwardly disposed, closely adjacent pellet holders. Usually vents will only be located in one angular section of the pellet holder subtending a minor angle around an outer direction (i.e. direction corresponding to the position of that particular pellet holder relative to the centrepoint of the pellet holders positioned on that level or tray).

A hydrogen generator may comprise said pellet tray assembly and an associated ignition control system (capable of controlling the time of firing of individual respective pellet holders) mounted inside a pressure vessel and the pellet tray assembly may comprise a plurality of pellet trays, each having individual separate pellet holders. The holders maybe arranged in successive outer rings, which rings may be of any shape (e.g. square, circular, hexagonal, etc). However, selective venting can be employed in any arrangement, whether an ordered or a random array of holders, including any number of successive outer regions, providing that most or all of the holders in each of the successive outer regions have outer vents and that they are fired, in use, successively in order in an inward direction starting with the outermost region.

Preferably, in such a pellet tray assembly at least one pellet holder tray comprises ignitors associated with each of the pellet holders and controlled by an ignition control system, which system is adapted to initiate ignitors associated with the outermost pellet holders prior to the more inwardly disposed pellet holders. Where there are at least two outer rings (or regions) of pellet holders, (most or all of) the outermost ring may be adapted to be initiated first prior to the next inner ring, and this may continue with each next inner ring in order before the central pellet holder or holders is initiated.

There is further provided a method of operating such a pellet tray assembly in a hydrogen generator with the said partially perforated pellet holders and ignition system, whereby the ignitors associated with the outermost pellet holders are initiated prior to the more inwardly disposed pellet holders. There is further provided portable equipment comprising a hydrogen generator as described above, which equipment may be in the form of a fuel cell.

There is further provided a number of alternative fourth aspects of the invention which concern the provision of partitioning (or separators) around the hydrogen generating units to provide various technical advantages. The features hereinafter described may be combined with any features described above, except where those clearly conflict. Thus, for example, the hydrogen generating elements and arrays may be as previously described, with the arrays being located on respective trays as previously described, which in turn may form part of assemblies as previously described.

Thus, in a fourth aspect there is provided a pyrolytic hydrogen generator comprising an array of hydrogen generating elements arranged side-by-side and separated from one another into cells by partitioning provided with directional venting designed to permit gases to exit laterally in outward directions only with respect to the centre of the array.

As a result, the venting of gases sideways in any array, whether circular, rectangular, hexagonal, or any other suitable shape depending on the shape of the generator, can be controlled so as to prevent cross-activation, which is usually a problem in the centre of such side-by-side arrays of such elements. Some or all of the elements may be separated from one another into cells, and usually each cell will contain only one element.

Usually each element will be operatively linked to a control system, usually each element being linked to a respective ignitor, which system controls the firing of the elements in a selected sequence. Initiation of pyrolysis of the hydrogen generating elements may be controlled by a control system in a sequence that minimises or avoids hydrogen generating elements venting outwardly towards unfired adjacent hydrogen generating elements. The sequence should be such that when most, or all, of the elements are fired, any elements disposed roughly outwardly from each of those elements has already been fired. The outermost hydrogen generating elements will usually be fired first. This will usually be successively followed by progressively inwardly disposed hydrogen generating elements (although there may be one or two odd exceptions) such that inwardly disposed hydrogen generating elements only fire and vent in the general direction of already fired, outer hydrogen generating elements.

Preferably, the directional venting directs (laterally) exiting gases and any exiting waste products towards adjacent, outwardly disposed, empty spaces. (There may also be upward escape of gas—through gaps—but it is the lateral gas movement that needs to be minimised to prevent cross-activation.) In the case of inwardly disposed hydrogen generating elements in the array, it preferably directs exiting gases and any exiting waste products towards gaps between neighbouring outwardly disposed hydrogen generating elements.

The hydrogen generating elements may comprise pellet(s) of hydrogen generating material and the partitioning separating the elements into (primary) cells may comprise individual housings surrounding the pellets(s), which housings have only outwardly facing vents. The vents may be located at a specific angle, e.g. plus or minus 5°, or may subtend a desired minor angle segment e.g. plus or minus 30°.

Ideally, the housings are additionally surrounded by a system of baffles extending between them and partitioning them into a further set of individual cells. Nested cells (i.e. cells within cells) allows more flexible control of venting, more choice of baffle/housing materials (insulators/conductors) and may provide more heat dissipation, if the baffles are thermally conductive. The further set of individual cells (i.e. secondary cells) may contain designated empty spaces disposed outwardly and adjacent to the housings, and, preferably, the outwardly facing vents in the housings direct exiting gases and any exiting waste products towards the designated empty spaces.

The baffles may be substantially porous so that most of their surface area allows gases to vent freely therethrough. Mesh or other highly porous structures, if thermally conductive, provide increased cooling.

The baffles may be formed as a one-piece grid arrangement.

In an alternative fourth aspect, there is provided a pyrolytic hydrogen generator comprising an array of hydrogen generating elements arranged side-by-side and a system of baffles extending between the adjacent hydrogen generating elements so as to partition them into individual cells, wherein said system comprises gas confining baffle elements and gas venting baffle elements, which elements control the lateral direction of venting gases within the array.

The gas venting baffle elements may be made of a heat conductive material so as to remove some of the heat from the gases quickly and, if necessary, both the gas confining and gas venting baffle elements may be made of a heat conductive material. However, in certain instances, it is preferable for the gas confining baffle elements to made of a heat insulating material, especially when used in the manner described below to prevent lateral movement within a particular region.

The system of baffles may partition the hydrogen generating elements into two or more adjacent, successively inwardly disposed regions of cells, with respect to the centre of the array. The cells in one of said regions may comprise gas confining baffle elements that prevent hot gases circulating between adjacent cells in said region. The cells in one of said regions may comprise gas venting baffle elements that allow hot gases to vent outwardly from said region of cells, with respect to the centre of the array. The gas venting baffle elements are preferably substantially porous.

Since generators are usually cylindrical pressure vessels, the generator may have a circular array of hydrogen generating elements partitioned up by the system of baffles into cells, there being a central region of one or more cells, and one or more successive outwardly disposed annular regions or rings of cells.

The system of baffles may comprise two or more concentric rings of circumferentially extending, gas venting baffle elements intersected by radially extending, gas confining baffle elements, so as to form the cells. The outermost, circumferentially extending baffle elements may surround the outer perimeter of the array of hydrogen generating elements, and, they may include a protruding portion on each cell of dead space extending beyond the perimeter; this may present a greater surface area for heat dissipation and may accommodate waste products within the perimeter from the pyrolysis of the hydrogen generating elements.

The baffle system may comprise one or more continuous rings forming the gas venting elements, as well as short segmented baffles that can be dropped in place inside the rings, forming the gas confining elements. Cells may be formed with double walls formed from overlapping segmented gas confining baffle elements. The radially extending baffle elements may be straight and extend in a single radial direction outwards (and may join concentric rings of circumferentially extending baffle elements), but are also advantageously formed of segments extending as part polygons, especially where these demarcate or capture dead volume.

In a further fourth aspect, there is provided a pyrolytic hydrogen generator comprising an array of hydrogen generating elements arranged side-by-side and having a system of baffles extending between the adjacent hydrogen generating elements so as to partition them into individual cells, wherein said system comprises a one-piece grid arrangement disposed over the array and formed of a collapsible honeycomb structure.

The structure may be heat conductive and formed from an extruded or expanded metallic honeycomb structure of the collapsible concertina type, or may be formed from extruded plastics, cardboard or other insulating materials. The system may be used over a part (e.g. central portion) or the whole of the array. The hydrogen generating elements are preferably equally sized and are equally spaced from one another in a regular, preferably hexagonal, array.

It will be appreciated that apparatus in accordance with any one of the above-mentioned fourth aspects may also contain some or all of the features of one or more of the other aspects;

apparatus embodying all the first three aspects, or all four aspects, provides especially good performance.

DESCRIPTION OF THE DRAWINGS

The various aspects of the present invention will now be described, by way of example only, with reference to the accompanying drawings, in which:

FIG. 14a is a perspective schematic view of a one-piece honeycomb baffle system for a 19 pellet holder tray, while

DESCRIPTION OF THE INVENTION

Figure 1:
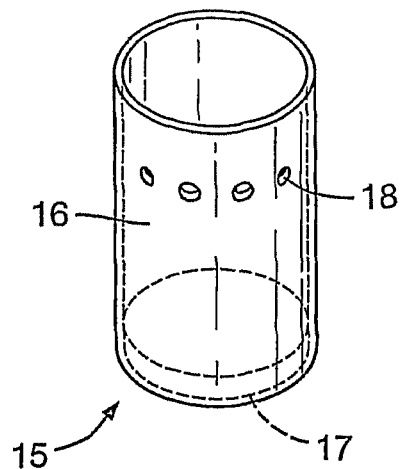
FIG. 1 is a perspective view of an assembled pellet holder for use in a hydrogen generator according to the first aspect of the invention.
Figure 9:
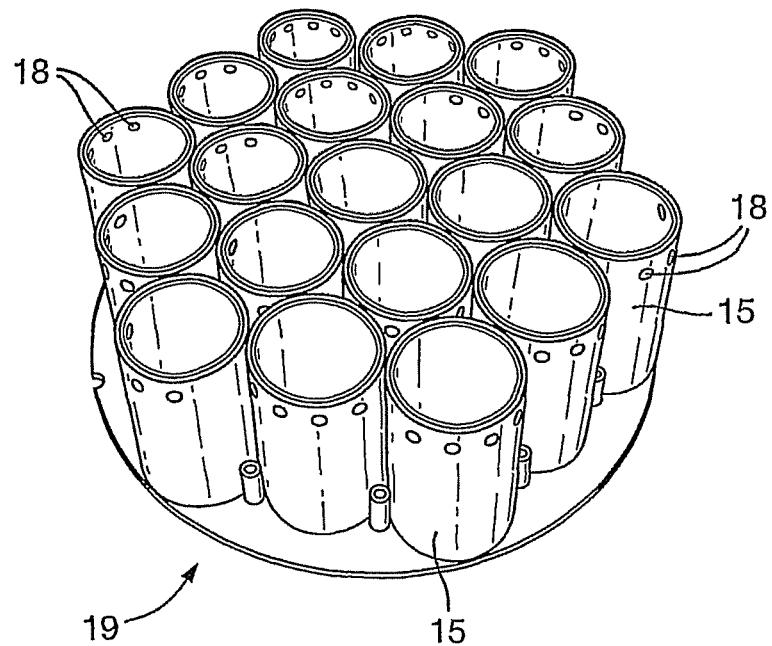
FIG. 9 is a perspective view from above of a pellet tray assembly according to the third aspect of the invention.

Referring to FIG. 1, a circular cardboard pellet holder for use in a hydrogen source according to the first aspect of the invention is illustrated. The single pellet holder 15 is of an open cup design and is formed from a cardboard tube 16 and a cardboard washer 17, which is fitted inside the cardboard tube 16 at one end to form a removable base. The washer 17 is a tight fit to prevent unwanted heat or hydrogen diffusing underneath to an adjacent cup. (Conveniently the burr from the cutting process can prevent the washer 17 slipping out.) The cup is 2 cm in height, of 1.6 cm internal diameter, with a 1 mm wall thickness. Vents 18 in the form of round holes are optionally provided on one angular section only of the tube 16 near the top edge, if venting of hot $H_2$ gas is required. As shown in FIG. 9 below, the holders 15 will normally be arranged in an array with the vents arranged outwardly from the centre of the array to allow venting substantially only in that direction.

Any suitable cardboard may be used, providing that it is sufficiently rigid, has been stored in a dry environment, and is not contaminated with undesirable chemical products (i.e. not treated or painted). Unbleached, unprinted cardboard is suitable, and any glues employed in the lamination of the cardboard or fabrication of components, e.g. tube forming, should employ adhesives which are inert when heated in the generator environment, such as, for example, those based on starch or polyvinyl alcohol. (Glues which might decompose to give off contaminants in the output hydrogen gas, for example, products harmful to a PEM fuel cell employed downstream, e.g. cyanoacrylates, should not be employed.) Lightweight cardboard, especially in the range 230-270 $g/m^2$, or rocket paper, may be used for example.

Despite the high temperatures in a pyrolytic hydrogen generator, the inventors have found that cardboard does not char or give rise to contaminants in the $H_2$ gas output. In fact, the cardboard does not show any visible degradation in the non-oxidising hydrogen atmosphere while if the generator is filled with air this causes most of the holder to burn up. This was confirmed in the following tests:—

Pellet Holder (Oxidising Atmosphere)

A single, 3 g (16 mm diameter) pellet of ammonia borane with supporting cardboard cup was positioned centrally on a PCB and then transferred into a sealed test generator. The pellet was thermally decomposed in the presence of oxygen by direct electrical heating of the ammonia borane. From the post mortem of the experiment, the cardboard holder was found to have considerable visible charring.

Pellet Holder (Non-Oxidising Atmosphere)

Figure 16:
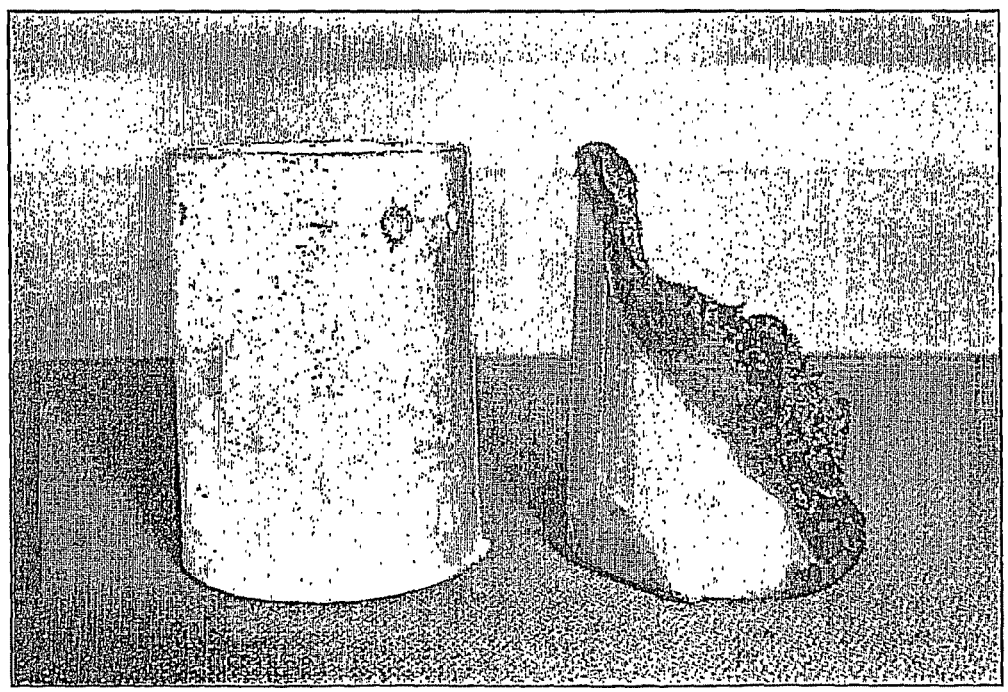
FIG. 16 is a photograph of the cardboard pellet holders after use in a hydrogen generator under oxidising and non-oxidising conditions.

The experiment was essentially a repeat of the above—a single, 3 g pellet, 16 mm diameter of ammonia borane was thermally decomposed by conventional means in a sealed test generator although the generator was purged initially with argon to remove all traces of air and was then further flushed with hydrogen to establish a reducing atmosphere. After the experimental post-mortem, the pellet holder was found to have retained its structural integrity and no visible charring of the cardboard was observed. FIG. 16 is a photograph showing the cardboard pellet holders after use. (Pellet shown on the right was the one in the oxidising atmosphere.)

None of the decomposition products usually associated with the decomposition of cardboard (e.g. carbon monoxide, carbon dioxide or cellulose binders) are generated during normal operation. When the output gases were characterised by GC-MS and FTIR (Fourier transform Infrared spectroscopy), no peaks associated with such products were found. For example, detailed analysis using FTIR showed no CO peaks, so that its concentration was <0.1 ppm (the detection limit of the equipment).

Figure 15:
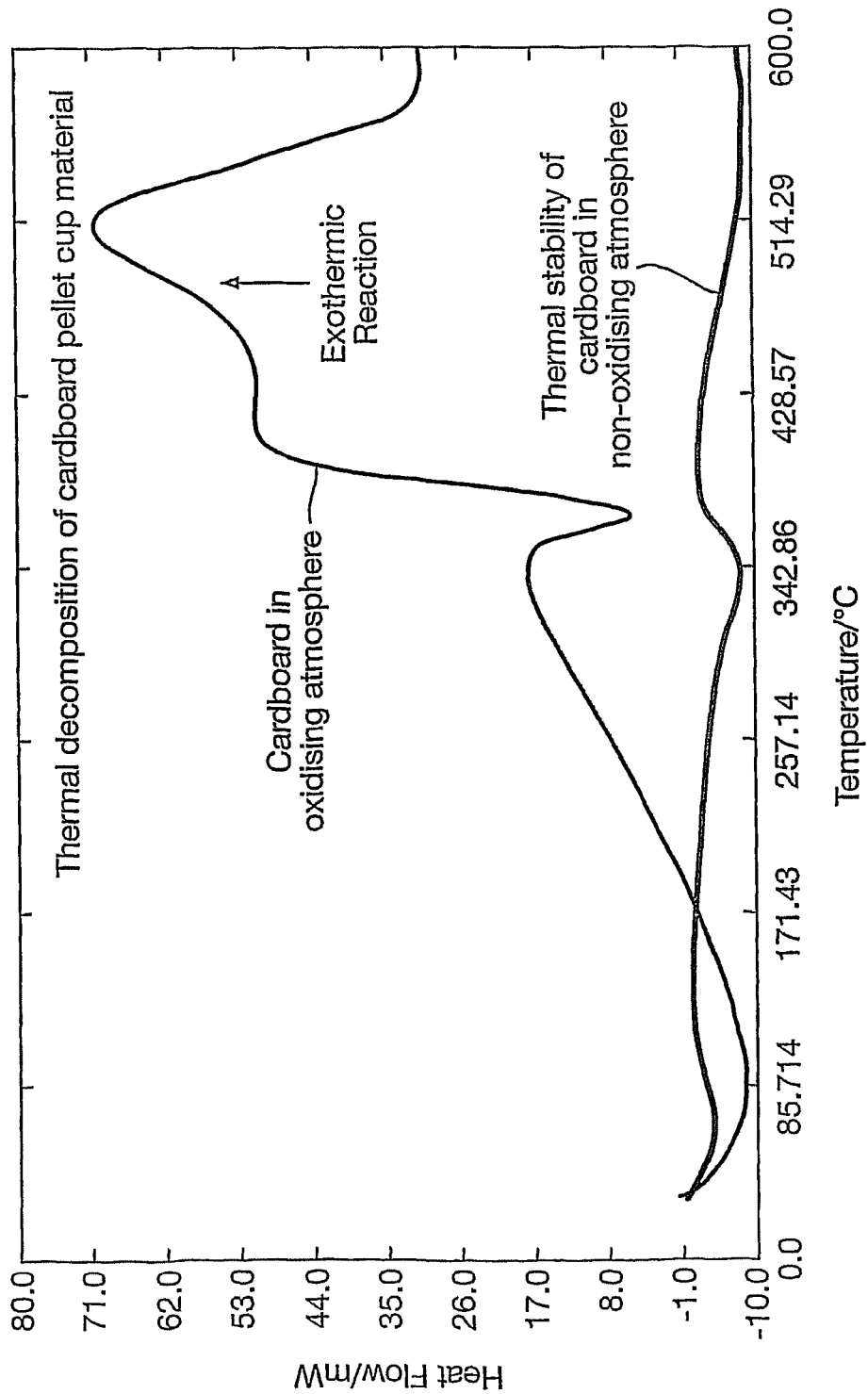
FIG. 15 is a DSC trace comparing the thermal output of a cardboard pellet holder used in a hydrogen generator under oxidising and non-oxidising conditions.

A further experiment compared the stability of the cardboard material used in oxidising and non-oxidising conditions by the use of differential scanning calorimetry (DSC) and the trace, reproduced as FIG. 15, shows the thermal output recorded. A significant exothermic event is only recorded in the case of the cardboard used in the oxidising atmosphere.

Figure 7A:
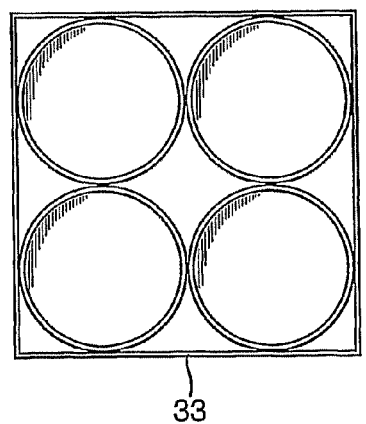
FIGS. 7a and 7b are schematic plan views of two alternative pellet holder arrangements according to the first aspect.
Figure 7B:
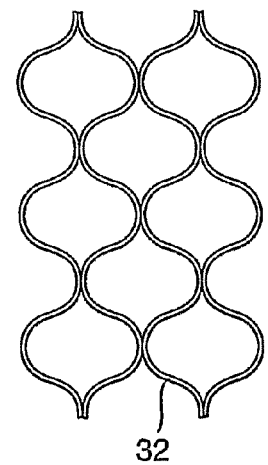

For portable applications, e.g. portable fuel cells, the lightweight medium and additional insulating qualities of the cardboard pellet holders (obviating the need for other insulators) allow significantly higher energy densities to be achieved in the final apparatus as compared to apparatus employing tufnol/ceramic cup holders (which can weigh 30% more). Also, as shown, the holders may readily be adapted to allow for venting or other functions.

Where cross-ignition is not a problem, the pellet holders may be linked in the form of an integral (one-piece) cardboard mesh or grid 32, as shown for example, in FIG. 7b. Cardboard may also be employed as barriers or supports 33 which may surround (individual or linked) pellet holders of any suitable material. In FIG. 7a, a square support 33 provides additional rigidity to individual cardboard pellet holders.

Figure 2:
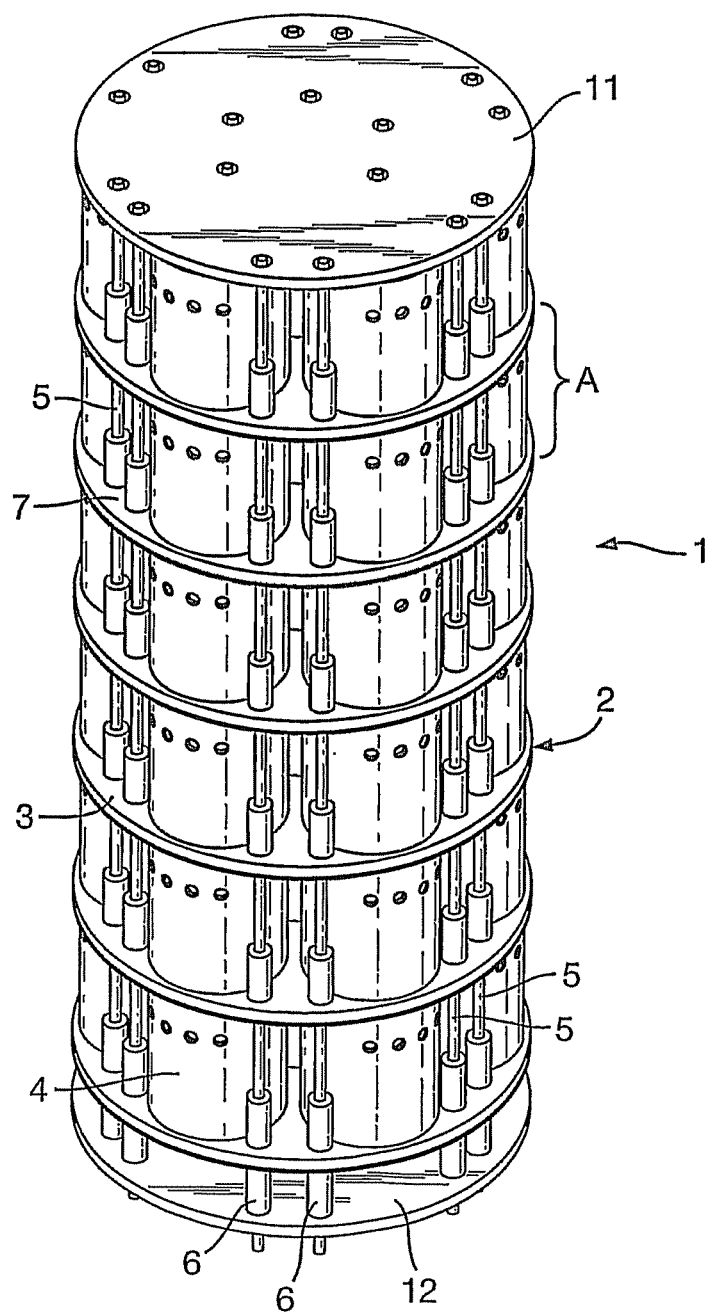
FIG. 2 is a perspective view from above of a pellet tray assembly according to the second aspect of the invention.

Referring to FIG. 2, this shows a pellet tray assembly containing pellet holders for use in a hydrogen source according to the first, second and third aspects of the invention. The assembly is intended to be mounted in a cylindrical cartridge (not shown) so as to form the hydrogen generator, which could be linked, for example, to a fuel cell for use as a portable power source.

Figure 3:
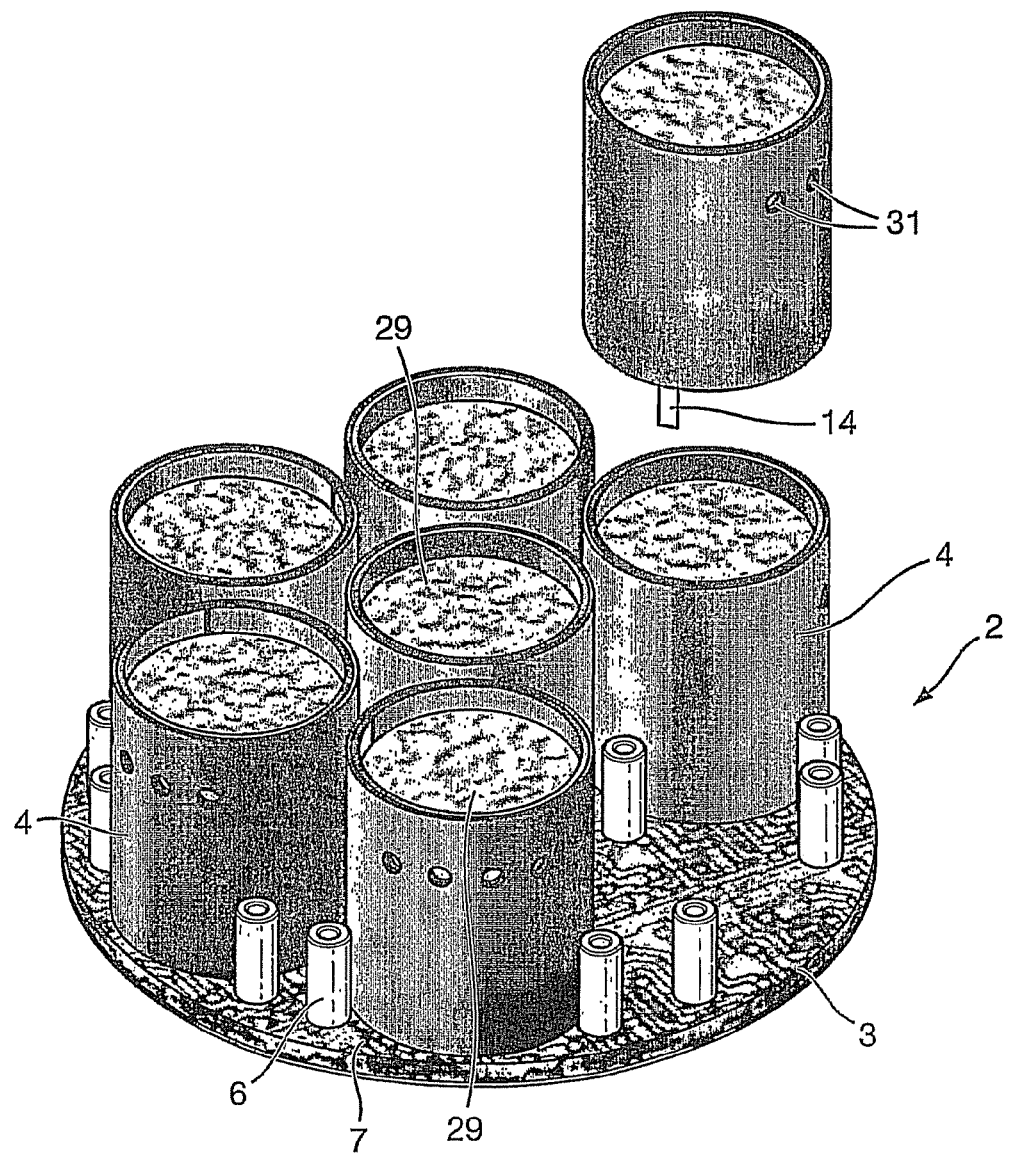
FIG. 3 is a perspective view of one pellet tray of the assembly of FIG. 2.

Cylindrical pressure vessels are usually preferred, and hence, the pellet tray/assembly is based on circular symmetry. The pellet tray assembly 1 comprises an elongate cylindrical stack 1 of circular pellet trays 2, mounted one on top of another (although it can be operated in any orientation). The assembly is a modular arrangement which can be adapted to meet different load requirements, but in the current arrangement comprises 6 trays. Each pellet tray 2 comprises a circuit board 3 on which are mounted seven pellet holders 4. The layout of each pellet tray is shown in FIG. 3. The pellet holders 4 are arranged in a hexagonal arrangement (between support tubes 5) with the seventh pellet holder placed at the centre. The pellet holders 4 in adjacent trays are vertically aligned so that they occupy identical positions throughout the stack 1.

Brass rods or support tubes 5 extend between adjacent trays 2 and are also aligned vertically throughout the stack 1 so as to form rising columns of support tubes 5. The rods are preferably hollow to reduce weight. These support tubes perform a dual function of connecting the stack together and providing electrical connectivity to the pellet holders of the respective trays. Some support rods may be provided to provide electrical connectivity to other sensors or devices located inside the stack 1, for example, thermisters (not shown), while also providing rigidity.

Figure 5A:
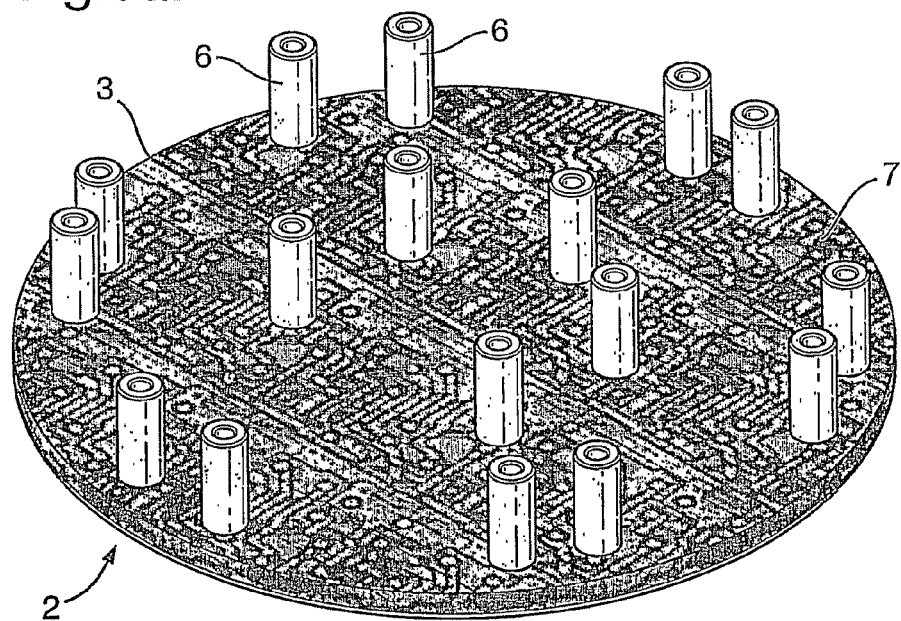
FIGS. 5a and 5b are perspective views from above and below, respectively, of the circuit board of the tray of FIG. 2.
Figure 5B:
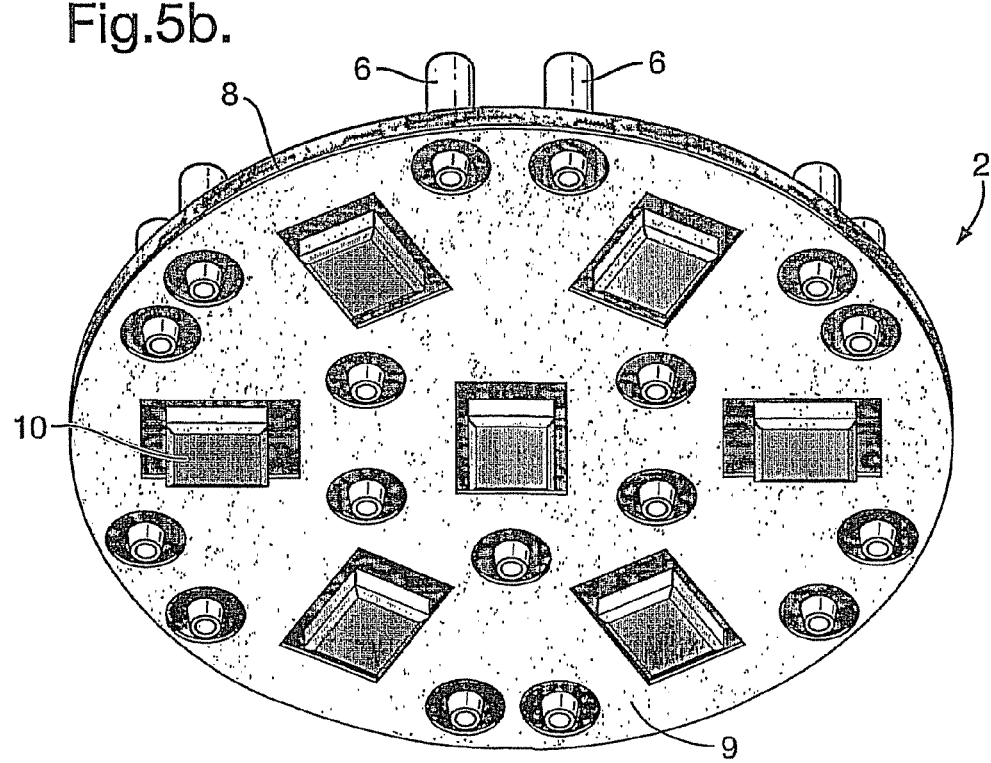
Figure 6:
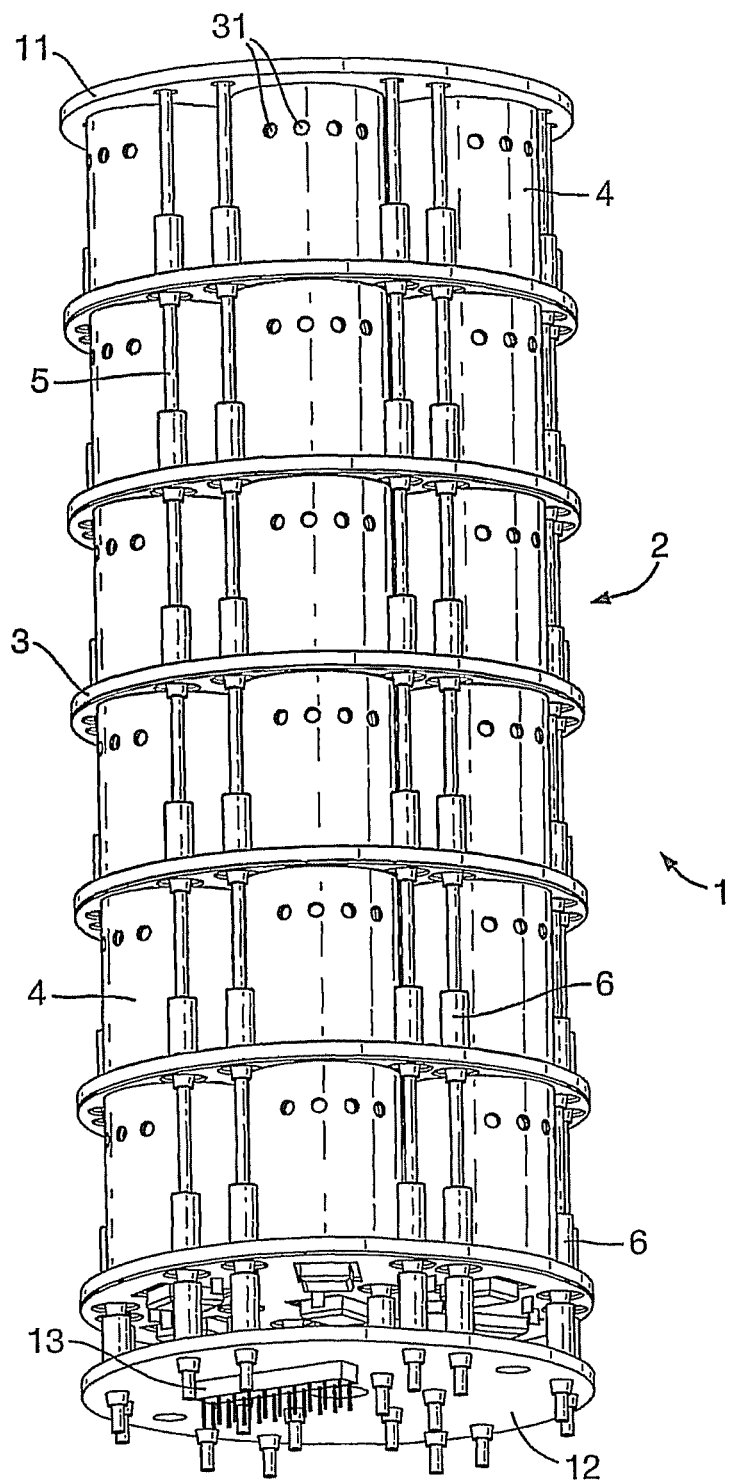
FIG. 6 is a perspective view from below of the pellet tray assembly of FIG. 2.

In the current embodiment, there is a set of rods associated with each tray level, the rods being roughly the same length as the pellet holders. The upper and lower ends of the tubes 5 are held fast in annular conducting pin grips 6 mounted on respective adjacent trays, the upper ends preferably being soldered into the pin grips 6. Referring to FIGS. 5a and 5b, the pin grips 6 extend beyond both faces of each tray, although they mainly project upwardly from the upper faces 7.

A circular dust filter/seal 8 is attached to the lower surface 9 of the circuit board. As may be seen, a diode 10 is located under each respective pellet holder 4 to ensure one-way flow, the diodes and pin grips 6 projecting through the seal 8. The top end of the stack 1 is sealed with an end capping circuit board 11 and the bottom end has an additional stack connection circuit board 12 provided with a connector 13.

Figure 4:
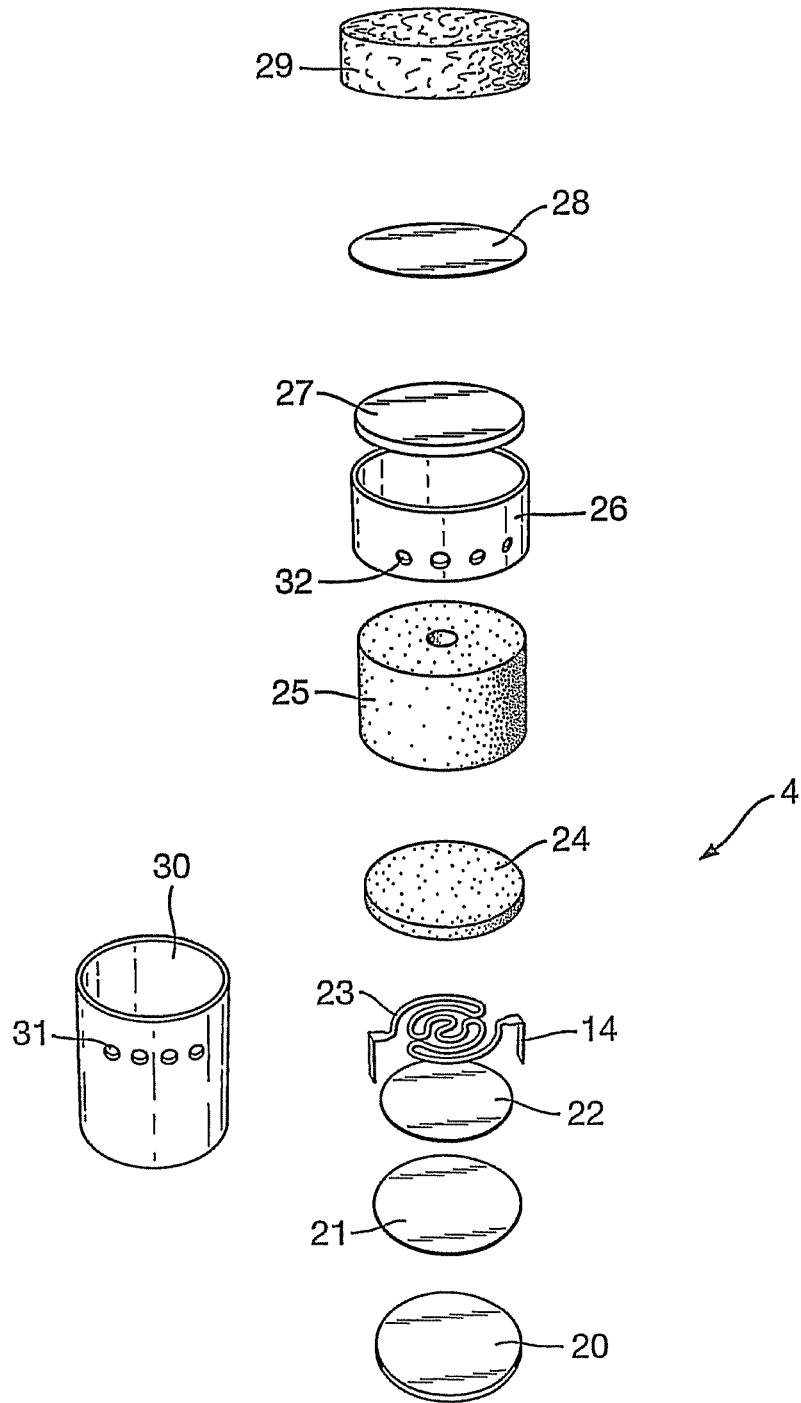
FIG. 4 is an exploded view of one pellet holder of the tray of FIG. 3.

FIG. 4 shows an exploded view of the components of a single pellet holder 4, when loaded and ready for use. The actual pellet holder 4 itself comprises a cardboard support disc 20, a cylindrical cardboard housing or tube 30 and a cardboard retaining ring 26 inset inside the housing.

On top of the cardboard support disc 20, there is placed a mica disc 21, a polyimide backing layer 22, and an ignitor/initiator in the form of a heater coil 23. Next, the housing 30 is loaded with the renewable chemical components, namely, a heat mix pellet 24 and a hydrogen generating pellet, in this case, a pressed ammonia borane pellet 25. The latter is held in place by the cardboard retaining ring 26, which is a tight fit inside the tube 30. An aluminium paper lid 27, an aluminium foil lid 28, and a glass wool plug 29, are placed in turn above the pellet for insulation and to prevent significant upward flow of $H_2$ gas to the tray above.

Each pellet holder 4 is pinned to the circuit board 3 by virtue of a pair of downwardly extending conducting flanges 14 that form the two ends of the heater coil (as shown in FIG. 3). Each of the 6 outer pellet holders 4 is partially perforated (according to the third aspect) on the portion of the tube 30 that faces outwardly, the perforations 31 directing the hot generated $H_2$ gas away from the other pellet holders 4 to prevent cross-ignition; the retaining ring 26 disposed inside the tube 30 has correspondingly aligned matching perforations. The central pellet holder 4 is surrounded by other holders, and is fired last; it has no perforations and is therefore protected from lateral gas flow.

The stack 1 is assembled by first assembling the stack connection circuit board 12 and then the individual pellet trays 4. As regards the latter, perforations 31 in the cardboard housing 30 need to be facing outwards and the components inside are compacted to ensure good contact. In particular, the heat mix pellet 24 needs to be in a closely abutting relationship with the ignitor coil 23 and hydrogen generating pellet 25.

The lowermost pellet tray 4 is placed upon the stack connection circuit board 12 using a shorter length set of support rods 5. Next the respective individual "complete" tray modules 4 are added. In this particular arrangement, the (longer) standard length support rods 5 are permanently soldered to the underside of the pin grips 6 so as to extend downwardly from a particular tray (see FIG. 8b) and are removably mounted onto the pellet tray 4 immediately below, from which tray a set of pellet holders extend upwardly (akin to stalactites and stalagmites). A "complete" tray module is indicated by bracket A on FIG. 2. Thereafter, the required number of "complete" pellet tray modules s are successively added to the stack and compressed to ensure a rigid stack. The end capping circuit board 11 is then fixed in place at the top end.

The stack 1, when loaded with pellets, can be inserted top end first into any suitable cartridge hydrogen generating pressure vessel, such as for example, a cartridge, as is known to the person skilled in the art (and described, for example in WO02/18267). The stack connection circuit board 12 will be connected to a suitable interface/end cap sealing the pressure vessel.

In the current arrangement, the circular trays are 5.6 cm diameter, with the circular pellet holders of ~1.6 cm diameter and ~2 cm height. Each pellet holder can hold 1 g of ammonia borane so that a 7 pellet tray is capable of holding 42 g of ammonia borane and generating 74 liters of $H_2$ gas. A stack of, for example, the current size would be suitable for powering a 50 W fuel cell for 2 hours, and hence, would be suitable for powering a 50 W device. e.g. a portable TV camera or radio equipment.

A preferred firing sequence would leave the firing of the central pellet in each tray to last, the outer pellets in each tray being fired first. It is also preferable to stagger the pellet firings around the stack (e.g. alternate opposite sides) to avoid the firing of adjacent pellets on the same tray or of adjacent pellets closely located in trays above or below each other, to avoid hot spots developing.

If desired an additional larger ring of pellet holders could be arranged outside the six pellet holders on a larger tray, providing that the pellet holders again have only outwardly directed perforations. Such a 19 pellet tray 19 is shown in FIG. 9. As long as the firing sequence ensures that the outermost ring of pellets is fully or nearly fully fired before the next innermost ring of pellets is initiated, it is possible to avoid cross-ignition of the more centrally located unfired pellets. Such an arrangement and method is in accordance with the third aspect of the invention.

EXAMPLE

In a test demonstration, the stack was loaded with 42×1 g pellets of ammonia borane (AB) and inserted into an experimental cartridge sealed by a purpose-designed interface control system to form a test hydrogen generator. This was linked to a 100 W PEM fuel cell. The cartridge was flushed with argon, and then pressurised with $H_2$. The total system weight of the AB fuel, cartridge and fuel cell was 3.47 kg.

The test lasted 51 minutes with the control system tripping out prematurely after 42 minutes so that only 32 of 47 pellets were activated. The measured average voltage was ~13V, the measured average current was ~3.5 A and the calculated mean power was ~46 W, which would integrate to a total energy of 58 Wh for this set-up. The mean power density (for the 3.47 Kg system) was 13 W/Kg.

In a further test, the same hydrogen generator was re-loaded and the load was increased to ~7.5 A, ~11V to deliver a peak power output of ~80 W, which was easily sustained for a few minutes. While pyrolytic hydrogen generators, as solid state systems, are intrinsically robust, the current stack arrangement has been found to be especially robust and reliable. In a further test, the system was successfully operated upwards, downwards, and on both sides (i.e. in 4 orientations passing through 360°) and was found to exhibit dynamic orientation independence.

It will be apparent to the skilled person that numerous modifications could be made to the current arrangement, still in accordance with the various above aspects of the present invention. For example, while it is highly preferred for the support rods 5 to occupy identical positions throughout the stack 1, so that direct connections can be made between rods 5 (and pin grips 6) from neighbouring trays, and structural rigidity can be optimised, it would be possible to use other arrangements where, for example, electrical connectivity has to be provided to non-aligned support rods of neighbouring trays via the circuit board on the trays. This would mean that adjacent trays would have different arrangements, for example, two different types of circuit boards in an alternating arrangement of the two types of trays, and may require the provision of additional pin grips that would only provide either an upward or a downward electrical connection, rather than both types of connection as in the present arrangement.

While the current pellet tray arrangement with round pellet holders and round trays is preferred, other holder/tray arrangements are also possible.

Figure 8A:
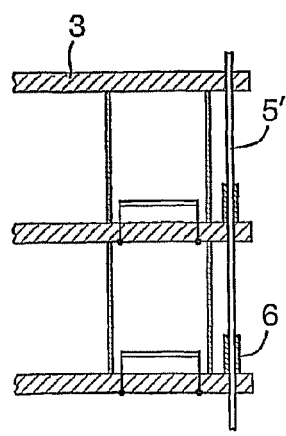
FIGS. 8a, 8b and 8c are schematic sectional views of three alternative support rod arrangements according to the second aspect.
Figure 8B:
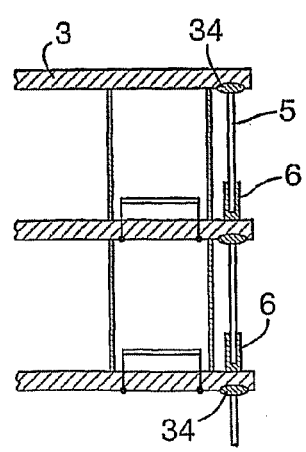
Figure 8C:
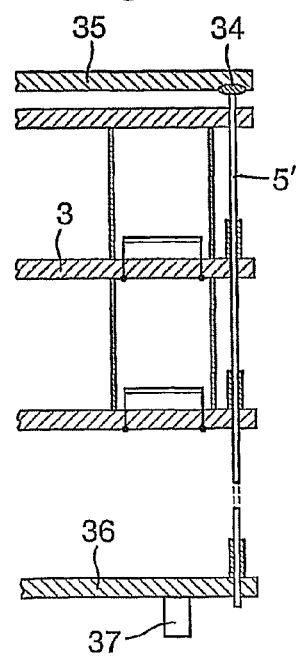

The current individual sets of support rods allow ready dismantling of the stack and addition/removal of trays. As shown in FIG. 8b, each (short) support rod 5 is fixed by a soldered joint 34 into the base of the pin grip 6 on the underside of the PCB 3 and extends down to the pin grip 6 of the tray below. However, assembling each tray module is time consuming and the soldered joints 34 may fail. Hence, the individual sets of short support rods 5 may be replaced with a single set of support rods 5' the same length as the final size of the stack, where that size is unlikely to change. Such rods are shown in FIGS. 8a and 8c. In all of FIGS. 8a, 8b and 8c, the pin grips 6 pass through and protrude from both the upper and lower sides of the PCB 3 (although the lower section is not shown), allowing use of either the long 5' or short 5 rods therein. In FIG. 8a, the respective trays 3 are linked together by individually manually inserting the full stack length rods 5' (150 mm) freely through a line of pin grips 6, and thereafter secured at each end after all of the rods 5' have been inserted. In FIG. 8c, the full stack length rods 5' are soldered on to a top plate PCB 35 at one end, with each tray 3 then being slid onto the stack 1 from the open end and pushed up tight against its neighbour before the connector PCB 36 bearing a 20 way connector 37 is attached.

Various heat baffle systems in accordance with the fourth aspect of the invention and intended to assist in reducing cross-activation of hydrogen generating elements will now be described with reference to FIGS. 10 to 17. These systems may all be employed in a pyrolytic hydrogen generator such as, for example, described above according to any one or more of the other inventive aspects, and which is loaded, in use, with hydrogen generating material. The systems are, however, especially applicable to a hydrogen generator based on ammonia borane thermal decomposition, and particularly ones where there is a heat management requirement, for example, where there is a high production rate and/or larger storage capacity. For example, management of excess heat is likely to be necessary in fuel cell applications with power requirements of 15 W or more, or in non-fuel cell applications where a hydrogen production rate averaging around 0.1-0.2 slpm (standard liters per minute) or more is required.

Figure 10A:
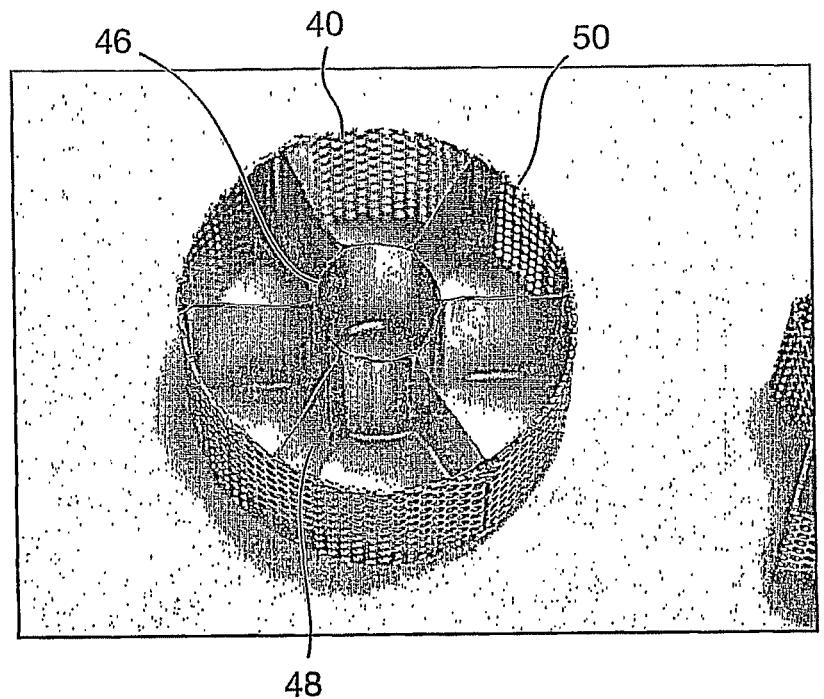
FIGS. 10a and 10b respectively show two alternative heat baffle systems for a 7 pellet holder tray.
Figure 10B:
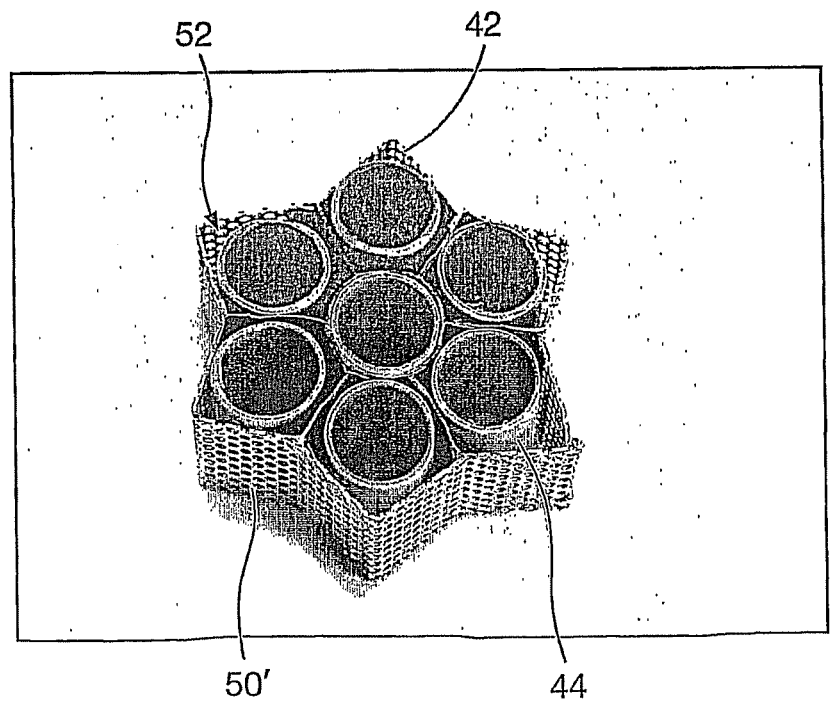

Referring first to FIGS. 10a and 10b, these show two alternative heat baffle systems 40, 42, both one-piece grid arrangements with seven cells designed to fit around an array of seven cardboard pellet holders 44 on a tray (not shown), such as for example, shown in FIG. 3 above, and containing ammonia borane pellets. In both cases, they would be used with cardboard pellet holders 44 having only outwardly facing holes or slits. These could be spread over a narrow angle (e.g. up to 50°), as shown in the seven pellet trays depicted in FIG. 2 above, or could be arranged vertically above one another and located at a specific angle, as discussed in relation to FIGS. 11b and 11c below. The nested cells configuration (cell defined by a housing within a cell defined by baffle elements) provides flexibility in how gas flow is controlled.

In each one-piece baffle system, a central hub 46 surrounds the centre pellet holder with vanes 48 extending radially and symmetrically outwards connecting to an outer ring 50. In each system, the walls of the hub and vanes are non-porous (i.e. have no through openings) while the walls of the outer ring are porous (i.e. have through openings—preferably of at least 1 mm width); by "porous" is included perforations, slits, slots, mesh or any other suitable holes, notches, etc. The outermost pellets would be fired before the central pellet. The non-porous walls substantially prevent the passage of hot gas or particulates laterally (sideways) from any one cell to adjacent cells in the outer ring or inwardly towards the central pellet holder. This reduces the potential of cross-activation which could result in lost efficiency or, indeed, thermal runaway of neighbouring pellets. The porous outer ring walls, which may for example be perforated, slotted, slitted, made of mesh, or similarly porous, in combination with the outwardly venting pellet holders, allow hot gases to vent outwardly away from the pellets per se.

In FIG. 10a, the spokes connect to a circular outer ring baffle element 50, while in FIG. 10b, this is replaced by a star-shaped perimeter baffle element 50'. The latter is preferred in that it has a higher surface area and has dead volume 52 within the cells that can accommodate residue products. (In the case of ammonia borane, the foaming residue products from the decomposed pellet can cause problems.)

The baffle system is formed of a (preferably lightweight) conductive material, which is non-reactive in the hydrogen generator atmosphere and usually metallic; examples include aluminium, copper, or titanium or their alloys. In this case, aluminium foil hubs and vanes and aluminium mesh outer rings were used. The metallic spokes, hubs and outer baffle elements all serve to conduct away the heat from a pellet that is firing and dissipate that heat over a much larger area, hence minimising hotspots. The use of a mesh outer ring is especially preferred since the high surface area of the mesh is particularly efficient in cooling the gases passing through its openings, as well as directing gases outwardly.

Both systems may be the same height or taller than the pellet holders and may be sufficiently rigid to support layers of pellets in the stack and provide the correct separation between layers when under compression. The baffle elements also prevent any sideways movements of the holders in their relative positions, which is particularly advantageous when the holders are not otherwise secured to the tray.

Figure 17A:
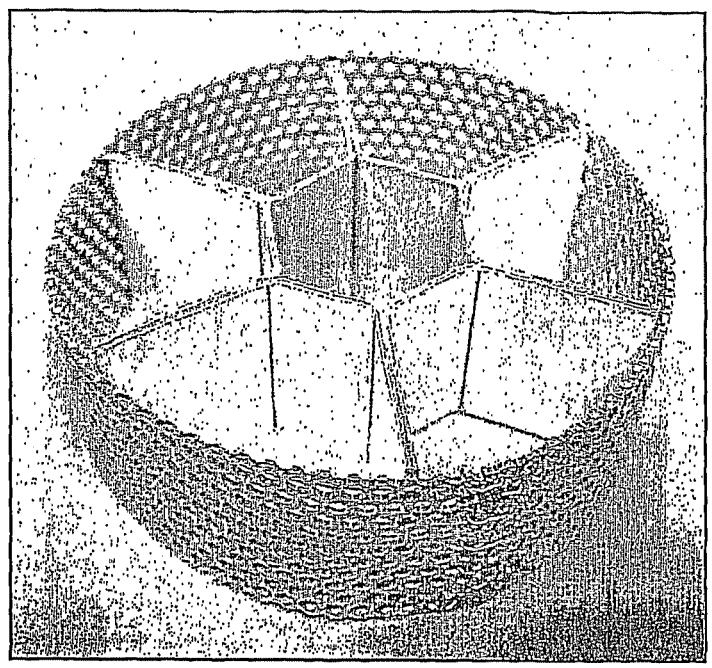
FIGS. 17a and 17b are photographs showing perspective and plan views, respectively, of an alternative baffle system with gas confining and gas venting elements.
Figure 17B:
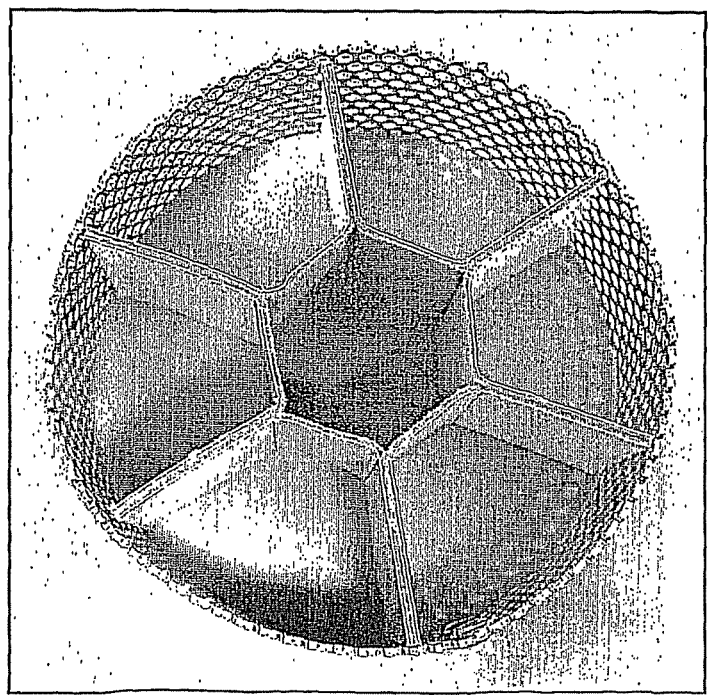

FIGS. 17a and 17b are photographs showing perspective and plan views, respectively, of an alternative baffle system with gas confining and gas venting baffle elements. While the baffle system of FIG. 10 was formed from heat conductive gas confining and gas venting baffle elements, in this baffle system the gas confining baffle elements are formed of cardboard and installed inside the circular mesh outer gas venting baffle element 40, as used in the FIG. 10a embodiment.

FIGS. 11a to 11f show a variety of alternative heat baffle systems for a 19 pellet holder tray on which a central pellet holder is surrounded by an outer ring of six pellet holders 54 of the same size, which ring is surrounded by a successive outer ring of twelve larger pellet holders 56. FIGS. 11 b and c depicts the same baffle systems as in FIGS. 10a and b, respectively, but now installed in a 19 pellet arrangement.

It has been found advantageous to use progressively larger pellets in successive outer rings of a multi-ring array. For example, in a 19 pellet tray with two concentric rings, regardless of the baffle system, if same size pellets are used throughout and the pellets in the centre are too large, the heat output will trigger cross-activations. However, such larger pellet sizes can be tolerated in the outer rings where the pellets are spaced further apart, allowing packing density to be maximised without cross-activation. Thus, in this case, the use of 19 mm pellets throughout the tray triggered cross-activations in the centre, while 16 mm pellets throughout the tray were acceptable. It was, however, found that the use of 18 mm pellets in the outer ring alongside the central 16 mm pellets was also acceptable, and maximised packing density.

The pellet holders are all provided with a vertical column of venting holes 70 (similar to those shown in FIG. 14a) that provide directional venting at only a specific angle 72 and the venting holes are always directed towards dead (empty), outwardly disposed spaces 74. Moreover, the venting holes in the inwardly disposed pellet holders are always located at the gaps 76 between pairs of adjacent pellets holders in the next outer ring.

In each figure, the direction of venting of every pellet holder is indicated by markings 72. In every arrangement, the baffle system is a one-piece grid arrangement. The baffle elements in the system may all be non-porous (as hereinbefore defined) hence preventing lateral venting and causing gas to vent vertically, or may all be substantially porous, in which case venting tends to follow the directionality in-built in the pellet holders although gas moves in other lateral directions as well. However, preferably, all the radially outwardly extending baffle elements are non-porous i.e. solid walled with no through openings, while the outer ring shaped baffle elements are all substantially porous.

Since the inner ring of pellets are more densely packed and more susceptible to cross-activation it may only be necessary and desirable (for weight reasons) to use a baffle system around the inner rings of pellets. However, the FIGS. 11e and 11f arrangements provide the baffle systems with the largest thermal mass and hence ability to delocalize and dissipate heat so as to prevent cross-activation.

Example

Figure 11A:
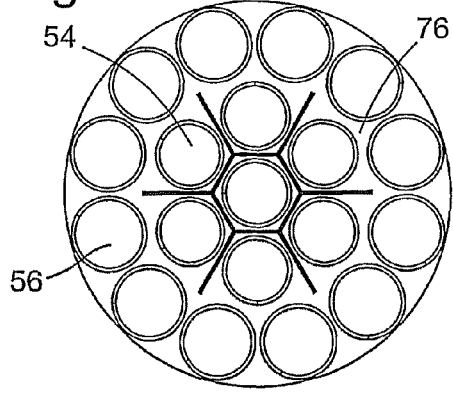
FIGS. 11a to 11f show six alternative heat baffle systems for a 19 pellet holder tray.
Figure 11B:
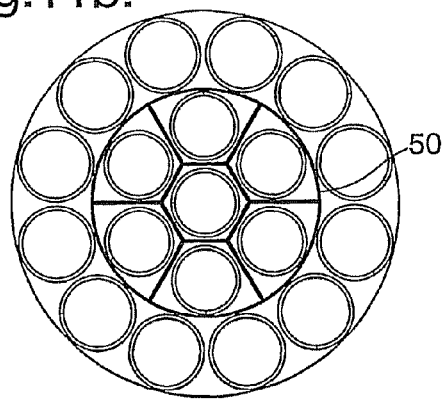
Figure 11C:
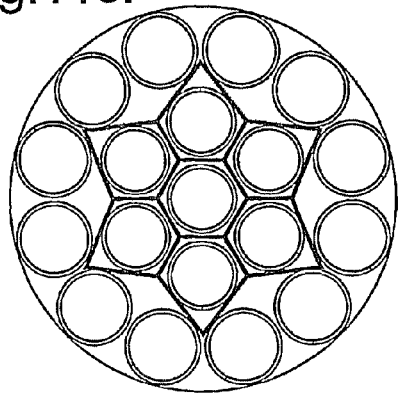
Figure 11D:
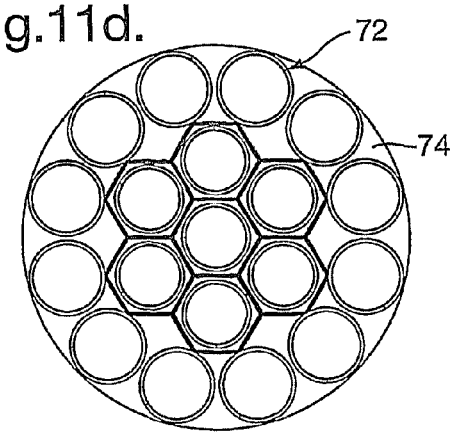
Figure 11E:
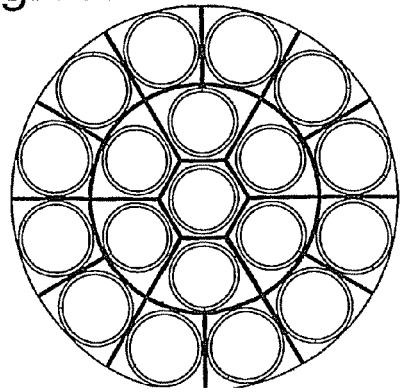
Figure 11F:
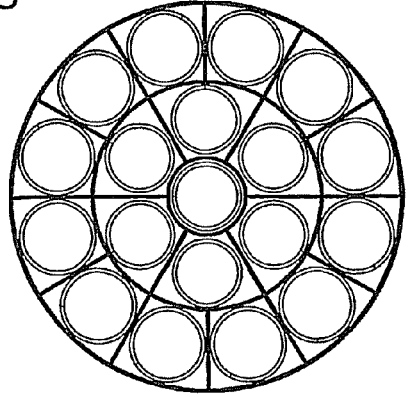

Experiments were conducted on the FIG. 11b pellet tray arrangement, with and without the circular baffle design 50. The board incorporated 18 mm pellets around the circumference and an internal ring of 16 mm internal pellets and a single central pellet. For both experiments the test generator was used with a backfill of hydrogen (10 bar) and conditioned to 40° C. to simulate the higher storage/working temperature of the generator. The initiation sequence consisted of decomposing 18 mm pellets around the circumference and then initiating the inner layer of pellets.

Cross activation of the inner pellets occurs as a result of (i) convection of hot gases from pellets decomposed from the outer ring, and (ii) conduction of heat from initiating the inner ring of pellets due to the closer proximity of the pellet positions compared to the outer ring.

The aluminium mesh baffle 50 addresses both cross activation scenarios by diffusing/cooling hot gases from the outer ring (a 50° C. drop in temperature across the baffle has been observed) and the solid separator (spokes) acts as a physical barrier to lateral gas flow. The use of the baffle resulted in no cross activation of the inner ring of pellets compared to total of 28% of internal pellets cross activated without the baffle (or 18% of pellets cross-activating in total, considering all pellets on the tray).

Figure 12A:
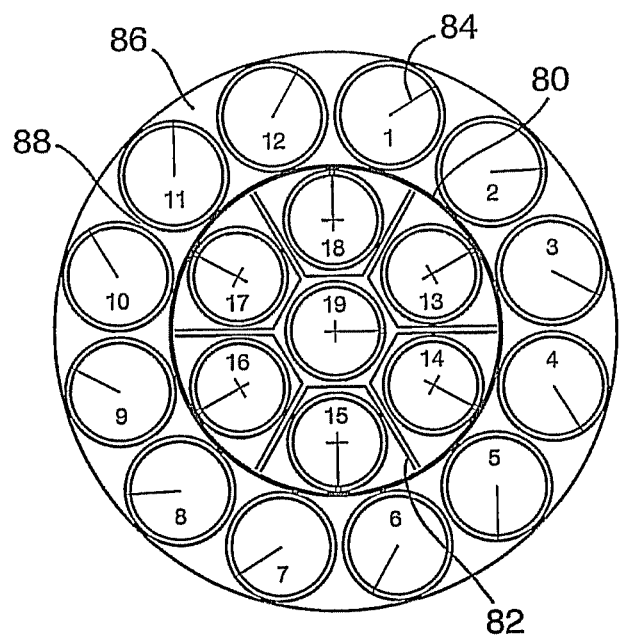
FIGS. 12a and 12b respectively show two alternative heat baffle systems for a 19 pellet holder tray and indicate the gas flow directionality.
Figure 12B:
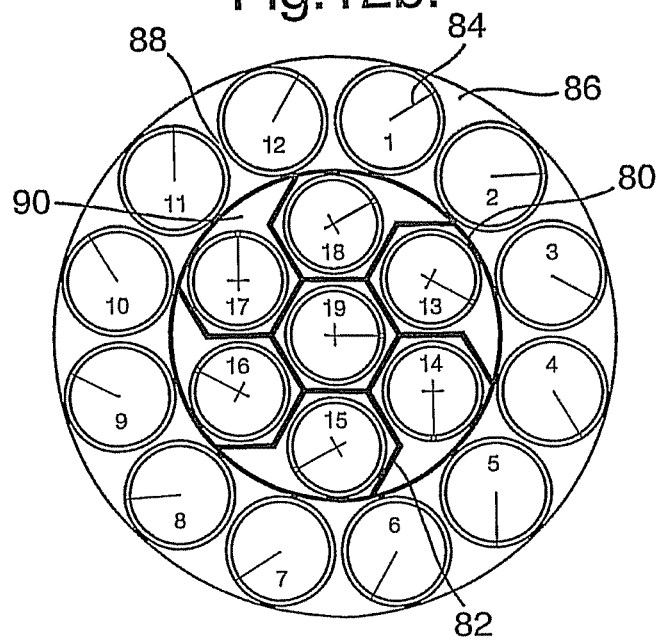
Figure 13:
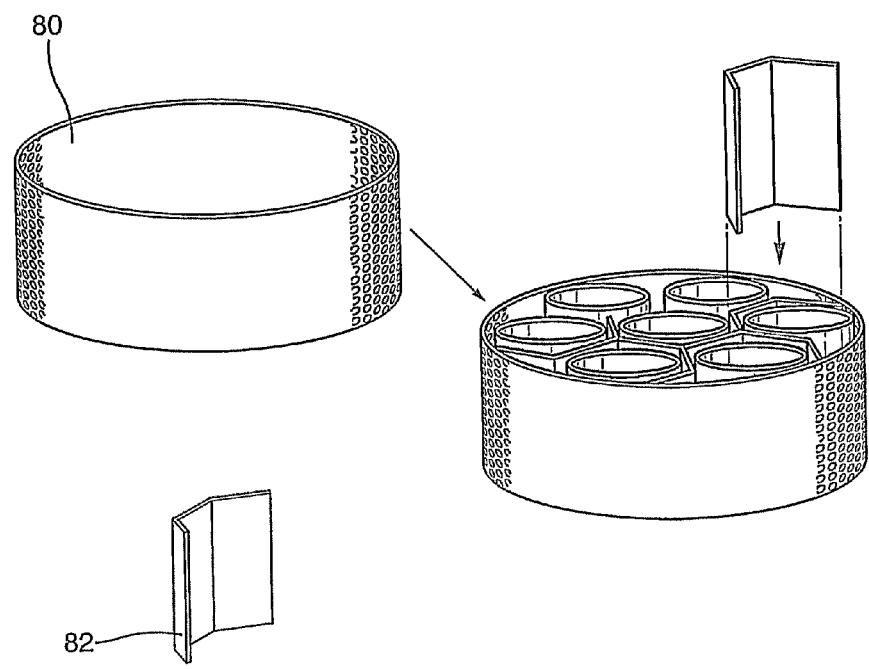
FIG. 13 is a schematic perspective view of the components of the heat baffle system of FIG. 12b.

FIGS. 12a and 12b show two further heat baffle systems for a 19 pellet holder tray. The trays again comprise a central pellet holder and two concentric outer rings of pellet holders, the outermost ring containing larger pellet holders, with a baffle system only located around the central pellet holder and next adjacent outwardly disposed ring. These systems are quick and easy to assemble and involve the use of a circumferentially extending baffle element 80 comprising a mesh ring, and segmented, half-hexagonal, solid walled baffle elements 82, which are all dropped into place. This is shown in FIG. 13, which is a schematic perspective view of the components of the heat baffle system of FIG. 12b.

The pellet holders are merely numbered for ease of identification; the numbering does not indicate their firing sequence.

Once again, the pellet holders are all provided with a vertical column of venting holes (similar to those shown in FIG. 14a) that provide directional venting at only a specific angle, as depicted by the radii 84 extending out from the centre of each pellet holder. In both arrangements, the venting holes are always directed towards dead (empty) spaces 86. Moreover, the venting holes in the inwardly disposed pellet holders are always located at the gaps 88 between pairs of adjacent pellets holders in the next outer ring. Thus, in FIG. 12a, inner pellet holder No. 17 is seen to vent towards the empty space between outwardly disposed pellet holders No. 10 and No. 11. The latter outermost pellet holders vent towards outwardly disposed dead spaces as well.

In FIG. 12a, the segmented baffle elements are arranged symmetrically, with radially outwardly extending limbs. There is the advantage that two thicknesses of baffle elements lie alongside one another between adjacent cells in the inner ring. However, any foaming residues are also expelled directly onto the mesh baffle element, which can cause blocking of the mesh. In FIG. 12b, the half hexagons are oriented differently to generate asymmetric dead areas 90 within the cell (adjacent the gaps in the outer pellet holders) and the venting of the inner ring of pellet holders is staggered (rather than purely radial) so that venting is aimed at the dead spaces, thereby minimising blocking of the mesh baffle element. Thus, in FIG. 12b, pellet holder No. 17 is seen to vent towards the empty space 88 between outwardly disposed pellet holders No. 11 and No. 12.

In a typical firing sequence, the outer pellets are generally fired before inner pellets, although an inner pellet can be fired as soon as the outwardly disposed, adjacent pair of pellets have fired. Hence, in FIG. 12a, once pellet holders No. 10 and No. 11 have been fired, pellet No. 17 can be fired, as it will only vent onto already fired pellets.

Figure 14A:
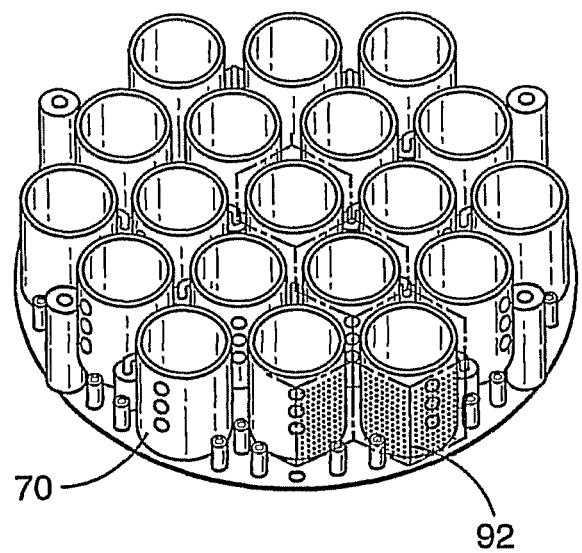
Figure 14B:
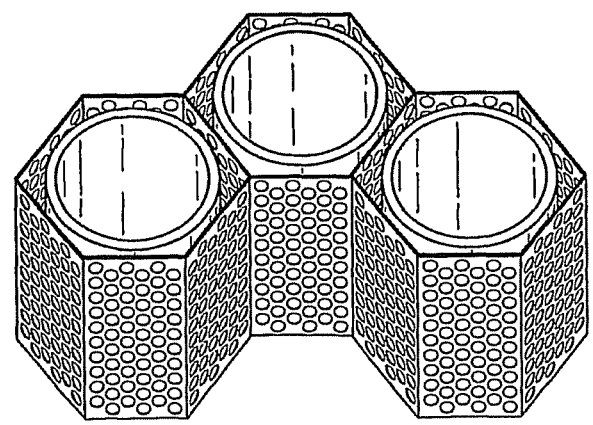
FIG. 14b is a schematic view of part of the honeycomb.

FIGS. 14a and 14b show an alternative heat baffle system for a 19 pellet holder tray similar to that of FIG. 9 above. FIG. 14a is a perspective view of the whole tray, but showing schematically only a portion 92 of the baffle system, while FIG. 14b shows three adjacent cells that would be formed by the baffle system, each containing a circular pellet holder. In this tray, the pellet holders are hexagonally close packed and are all the same size. They are separated by a hexagonal, honeycomb-type, ready-made baffle system constructed from extruded metal, such as, for example, extruded (expanded) aluminium. Such metallic honeycomb structures are available in a variety of cell sizes and cell heights. They are lightweight and flexible and quick and easy to install since they collapse/expand concertina fashion and may be used over a part (e.g. central portion) or the whole of the array. They may also provide stiffness and structural support to a stack of pellet trays, thereby preventing deflection of the stack under shock and/or vibration. The honeycomb cell height may be selected to provide the correct separation between adjacent pellet trays in the stack. The metallic baffle system again provides a heat sink to cool gas exiting a pellet and delocalize that heat, and where the honeycomb has solid walls, physically obstructs lateral hot gas plumes from cross activating pellets out of sequence. Collapsible honeycomb structures made of insulating material are also commercially available and may be used.

While the honeycomb will usually be solid (non-porous) walled to minimise lateral gas circulation, it may be perforated, slitted or slotted, etc. In this embodiment, the honeycomb was perforated and the directionality of the gas flow was controlled solely by the outwardly venting vents in the pellet holders which, in this case, were a column 70 of holes aligned vertically above one another at only a specific angle/point on the holder circumference. It will be seen that the vents on inwardly disposed pellet holders are aligned so as to vent towards the gap between adjacent, neighbouring pairs of outwardly disposed pellet holders.

It will be apparent to the skilled person that numerous modifications could be made to the current arrangement, still in accordance with the various above aspects of the present invention.

The invention claimed is:

1. A pyrolytic hydrogen generator comprising an array of pyrolytic hydrogen generating elements arranged side-by-side and separated from one another into cells by partitioning provided with directional venting designed to permit gases to exit laterally in outward directions only with respect to the centre of the array.

2. A pyrolytic hydrogen generator as claimed in claim 1, wherein initiation of pyrolysis of the hydrogen generating elements is controlled by a control system in a sequence that minimises or avoids hydrogen generating elements venting outwardly towards unfired adjacent hydrogen generating elements.

3. A pyrolytic hydrogen generator as claimed in claim 1, wherein the directional venting for inwardly disposed hydrogen generating elements in the array directs exiting gases and any exiting waste products towards gaps between neighbouring outwardly disposed hydrogen generating elements.

4. A pyrolytic hydrogen generator as claimed in claim 1, wherein the hydrogen generating elements comprise pellet(s) of hydrogen generating material and the partitioning comprises individual housings surrounding the pellets(s), which housings have only outwardly facing vents.

5. A pyrolytic hydrogen generator as claimed in claim 4, wherein the housings are additionally surrounded by a system of baffles extending between them and partitioning them into a further set of individual cells.

6. A pyrolytic hydrogen generator as claimed in claim 5, wherein the baffles demarcate cells containing designated empty spaces disposed outwardly and adjacent to the housings.

7. A pyrolytic hydrogen generator as claimed in claim 6, wherein the outwardly facing vents in the housings direct exiting gases and any exiting waste products towards the designated empty spaces inside the baffles.

8. OA pyrolytic hydrogen generator as claimed in claim 5, wherein the baffles are substantially porous so that most of their surface area allows gases to vent freely therethrough.

9. A pyrolytic hydrogen generator as claimed in claim 7, wherein the baffles are formed as a one-piece grid arrangement.

10. A pyrolytic hydrogen generator as claimed in claim 1, wherein the array of hydrogen generating elements is partitioned up by a system of baffles into the cells, there being a central region of one or more cells, and one or more successive outwardly disposed annular regions of cells.

11. A pyrolytic hydrogen generator as claimed in claim 10, wherein the system of baffles comprises two or more concentric rings of circumferentially extending gas venting baffle elements intersected by radially extending, gas confining baffle elements, so as to form the cells.

12. A pyrolytic hydrogen generator as claimed in claim 9, wherein the one-piece grid arrangement is formed of a collapsible honeycomb structure.

13. A method of operating a pyrolytic hydrogen generator according to claim 1, wherein pyrolysis of the outermost hydrogen generating elements is initiated prior to the more inwardly disposed hydrogen generating elements.

14. Portable equipment comprising a pyrolytic hydrogen generator according to claim 1.

\* \* \* \* \*